United States Patent [19]
Twerdochlib et al.

[11] Patent Number: 5,148,711
[45] Date of Patent: Sep. 22, 1992

[54] APPARATUS AND METHOD FOR REMOVING COMMON MODE VIBRATION DATA FROM DIGITAL TURBINE BLADE VIBRATION DATA

[75] Inventors: Michael Twerdochlib, Oviedo; Paul F. Rozelle, Fern Park; Santitavee Sarasas, Winter Park, all of Fla.

[73] Assignee: Westinghouse Electric Corp., Pittsburgh, Pa.

[21] Appl. No.: 607,934

[22] Filed: Nov. 1, 1990

[51] Int. Cl.[5] .................... G01H 11/00; G01B 7/14
[52] U.S. Cl. .................................. 73/660; 324/207.11
[58] Field of Search ............... 73/602, 649, 658, 660, 73/661; 324/207; 364/550, 556, 560, 569, 571.02, 571.04, 571.05

[56] References Cited
U.S. PATENT DOCUMENTS

| | | | |
|---|---|---|---|
| 4,049,644 | 9/1977 | Wennerstrom | 364/560 |
| 4,573,358 | 3/1986 | Luongo | 73/660 |
| 4,593,566 | 6/1966 | Ellis | 73/660 |
| 4,790,189 | 12/1988 | Twerdochlib | 73/660 |
| 4,887,468 | 12/1989 | McKendree et al. | 73/660 |
| 4,996,880 | 3/1991 | Leon et al. | 73/660 |
| 5,015,949 | 5/1991 | Koch et al. | 73/660 |

*Primary Examiner*—Louis Arana

[57] ABSTRACT

A sensor produces a signal indicative of the actual arrival time of each turbine blade at the sensor. A first circuit is responsive to the sensor for producing digital data representing the actual arrival time of each blade at the sensor. A second circuit establishes expected arrival times for each blade at the sensor. A third circuit is responsive to the digital data for generating a plurality of data entries each representing the difference between the actual arrival time and the expected arrival time. A fourth circuit stores the data entries in a first string having a plurality of dummy entries at the beginning thereof and at the end thereof and inserts into the string space saver characters in the event that the data entry for a particular blade is not produced. A fifth circuit establishes a running average value, over a plurality of data entries, for each data entry. The running average value is representative of common mode vibration. The average value is subtracted from its corresponding data entry to produce a second string wherein the entries in the second string are free of common mode vibration data.

8 Claims, 7 Drawing Sheets

FIG. I.

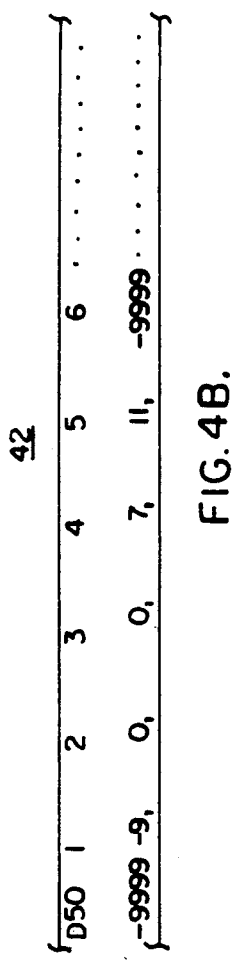
FIG. 4A.
FIG. 4B.
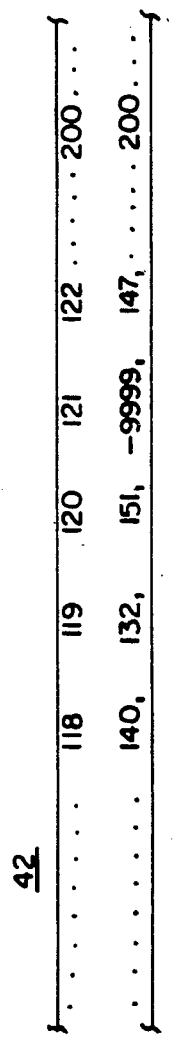
FIG. 4C.
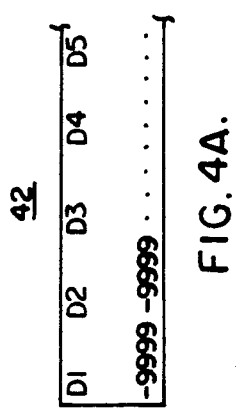
FIG. 4D.
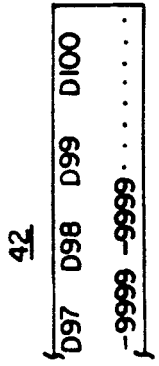
FIG. 4E.
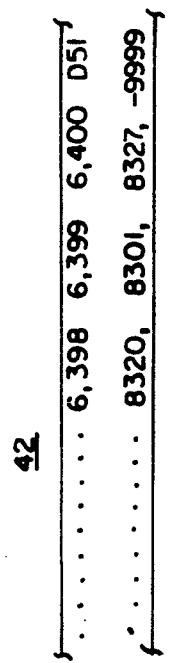

APPARATUS AND METHOD FOR REMOVING COMMON MODE VIBRATION DATA FROM DIGITAL TURBINE BLADE VIBRATION DATA

BACKGROUND OF THE INVENTION

1. Field of the Invention

The present invention is directed generally to monitoring operating parameters in a steam turbine and, more specifically, to the monitoring of the vibration of rotating turbine blades.

2. Description of the Background

Turbine blades, because of their complex design, are subject to vibration at frequencies which correspond to natural frequencies of the blades. Each natural frequency is associated with a particular mode, each of which is a different combination of vibrational deflections such as along the rotational axis of the turbine, perpendicular to the rotational axis of the turbine, etc. To prevent excessive vibration of the blade about its normal position, prudent design practice dictates that the blades be constructed such that the frequencies of the lowest modes fall between harmonics of the operating frequency of the turbine. However, manufacturing tolerances, changes in blade attachment to the rotor, changes in blade geometry due to erosion, and changes in the operating frequency of the turbine, among other factors, may cause modal frequencies to approach the harmonics of the operating frequency.

The approach of a modal frequency to a harmonic of the operating frequency may result in vibration. Alternatively, the blades may be excited by non-synchronous forces associated with aerodynamic phenomena such as buffeting or flutter. That may occur even if the natural resonance frequencies of the blade are not near the harmonics of running speed of the turbine. When the amplitude of the vibration exceeds a certain level, objectionable stresses are set up in the blade. If the condition is not detected and remedied, the blade may eventually fracture resulting in an extremely costly forced outage of the machinery. Thus, a method for detecting vibration is useful to prevent such damage.

One prior art method for detecting turbine blade vibration uses permanently installed, non-contacting proximity sensors. An example of such an apparatus is disclosed in U.S. Pat. No. 4,573,358 to Luongo wherein a plurality of sensors spaced about the periphery of the blade row detect vibration of operator selected blades. With that apparatus, one blade can be monitored at any given time. Other apparatus utilizing non-contacting proximity sensors are U.S. Pat. No. 4,593,566 to Ellis and U.S. Pat. No. 4,887,468 to McKendree et al.

Digital turbine blade vibration data produced in accordance with the teachings of the aforementioned patents may include, in addition to the pertinent blade tip deflection data, blade tip deflection data common to all the blades in the row. That data is referred to as common mode vibration data because all of the blades experience the same vibration as a result thereof. Phenomena known to cause such common mode tip deflections are static displacement, torsional vibration, and rotor speed changes. If the frequencies of such displacement are low, it is known that the blade stresses as a result of such tip deflections are not significant because the blades are displaced as a whole, with little or no relative motion between various positions of a blade.

Current data analysis techniques used on blade tip deflection data to determine if common mode vibration data is present are performed manually and are comprised of the following steps:

finding the blade passing time data corresponding to the blade of interest;

computing the displacement by multiplying the difference between the actual blade passing times and the expected blade passing times by the turbine blade tip velocity;

Fourier-transforming the displacement data to obtain deflection as a function of harmonic; and manually observing the data.

Upon manual observation, vibration that is seen to affect all blades about equally in amplitude and phase may be determined to be due to speed changes or to low frequency torsional responses. The operator must then exercise his judgment and either totally discard the data set or estimate and remove the contribution to the vibrational data from those effects. Clearly, such a process is very time consuming and calls the skill of the operator into play to determine when a tip deflection can be ignored. Analysis of apparent blade vibration data may actually prove to be nothing more than a measurement of a non-vibrational effect such as static displacement. Operator intervention to make such judgments and to select valid data is not practicable for an on-line blade vibration monitor. Thus, the need exists for an apparatus and method for removing common mode blade vibration data from data representative of other types of blade vibration.

SUMMARY OF THE INVENTION

The present invention is directed to an apparatus and method for removing common mode vibration data from digital turbine blade vibration data in a fast, efficient manner which does not require the intervention of a skilled operator. A sensor produces a signal indicative of the actual arrival time of each turbine blade at the sensor. A first circuit is responsive to the sensor for producing digital data representing the actual arrival time of each turbine blade at the sensor. A second circuit establishes an expected arrival time for each turbine blade at the sensor. A third cicuit is responsive to the digital data for generating a plurality of data entries, each data entry representing the difference between the actual arrival time and the expected arrival time of one of the turbine blades at the sensor. A fourth circuit stores the data entries in a first string. The first string has a plurality of dummy entries at the beginning thereof and at the end thereof for the purpose of simplifying the algorithm needed to calculate a running average. The fourth circuit also inserts into the first string space saver characters in the event that the data entry for a blade is not produced. A fifth circuit establishes a running average value, over a plurality of data entries, for each data entry. The running average value is representative of the vibration common to all of the turbine blades, i.e. representative of common mode vibration. A sixth circuit subtracts each of the average values from its corresponding data entry in the first string to produce a second string wherein the entries in the second string are free of common mode vibration data.

The present invention is also directed to a method of removing common mode vibration data from digital turbine blade vibration data comprising the steps of producing a signal indicative of the actual arrival time of each turbine blade at a sensor. Digital data representing the actual arrival time of each turbine blade at the sensor is produced from that signal. Expected arrival times for each turbine blade at the sensor are established. A plurality of data entries, each representing the difference between the actual arrival time and the expected arrival time of one of the turbine blades at the sensor, is generated. The data entries are stored in a first string having a plurality of dummy entries at the beginning thereof and at the end thereof. Space saver characters are inserted into the first string in the event that a data entry for a particular blade is not produced. A running average value is established, over a plurality of data entries, corresponding to each data entry. That average value is representative of the vibration common to all of the turbine blades. Each average value is subtracted from its corresponding data entry in the first string to produce a second string wherein the entries in the second string are free of common mode vibration data.

The present invention is an automated process for isolating blade tip deflections associated with significant blade stresses. Further, spurious data from non-vibrational effects is automatically and continuously removed. Because of the manner in which the first string is comprised, it is easier to find data entries and reduce the processing time for each entry. Shorter data processing time means shorter intervals between observation of a particular blade. Shorter intervals mean reduced time between onset of vibration and notification of the operator and increased likelihood of detecting a transient high deflection event. Those and other advantages and benefits of the present invention will become apparent from the Detailed Description of The Preferred Embodiment hereinbelow.

BRIEF DESCRIPTION OF THE DRAWINGS

For the present invention to be clearly understood and readily practiced, a preferred embodiment will now be described, by way of example only, with reference to the accompanying figures wherein:

FIGS. 4A-4E illustrate portions of the first string;

DETAILED DESCRIPTION OF THE PREFERRED EMBODIMENT

Figure 1:
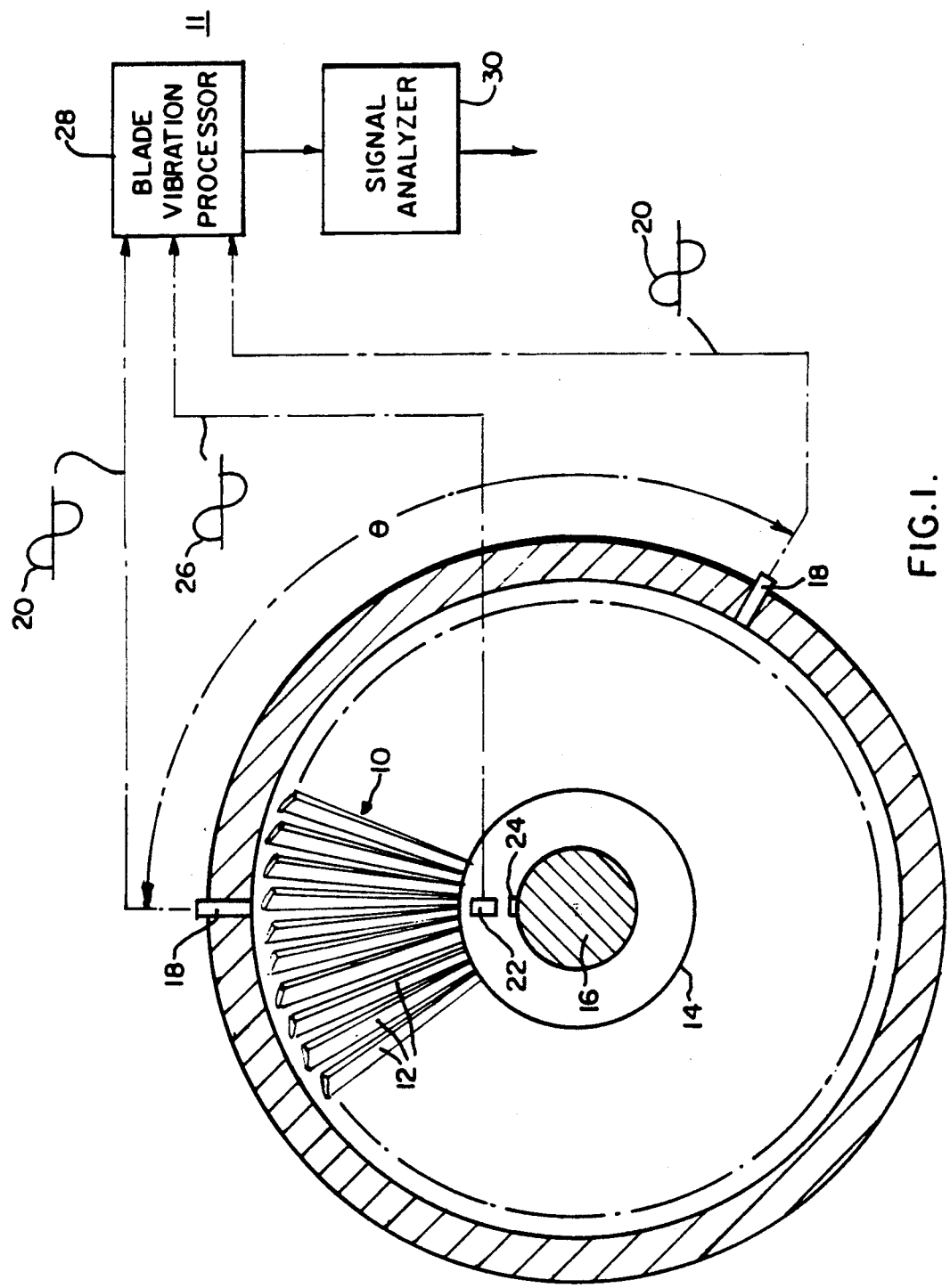
FIG. 1 illustrates an unshrouded turbine blade row and a blade vibration monitoring system which may incorporate the apparatus and method of the present invention.

FIG. 1 illustrates an unshrouded turbine blade row 10 and a blade vibration monitoring system 11 with which the present invention can be employed. Like reference numerals are employed among the various figures to designate like elements. A plurality of turbine blades 12 are connected to a rotor 16 by means of a rotor disk 14. Although FIG. 1 shows only several turbine blades 12, the reader will understand that more than one hundred turbine blades 12 may be contained within a single blade row 10 and that the turbine rotor 16 may carry several rows 10 of blades 12.

The blade vibration monitoring system 11 shown in FIG. 1 includes two turbine blade sensors 18. Each sensor 18 produces a signal 20 having a sinusoidal type waveform with every other zero crossing (See FIG. 2) corresponding to the "top dead center" of each blade in the row 10 passing under that sensor. Thus, the signals 20 are indicative of the actual time of arrival of each blade 12 at each sensor 18. The sensors 18 may be variable reluctance sensors or may incorporate any practical method of sensing a blade passing event including, but not limited to, microwave or optical methods. The sensors 18 may be displaced from one another by an angle of, for example, 135°.

As further illustrated in FIG. 1, a reference sensor 22 operates in conjunction with an indicia 24 on the rotor 16 to provide an output signal 26 having one zero crossing per rotor 16 revolution. The production of such a once per revolution (OPR) reference signal 26 is commonly known in the turbine art.

The signals 20 from blade sensors 18 and the OPR signal 26 are input to a blade vibration processor 28. The output of the blade vibration processor 28 is input to a signal analyzer 30. Details of the construction and operation of the blade vibration processor 28 and the signal analyzer 30 are disclosed in U.S. Pat. No. 4,887,468, which is hereby incorporated by reference.

Figure 2:
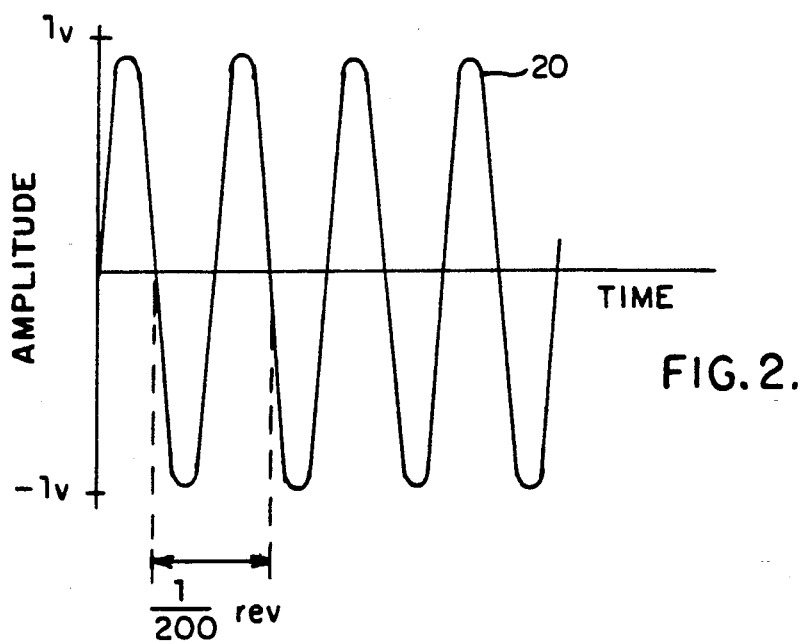
FIG. 2 illustrates the signal produced by the sensors shown in FIG. 1.

Referring to FIG. 2, one purpose of the blade vibration processor 28 is to convert the signals 20 into digital data representing the actual arrival time of each turbine blade 12 at each sensor 18. In FIG. 2, assuming two hundred turbine blades 12 in the row 10, then the time between every other zero crossing represents 1/200th of a revolution. By using the zero crossings to latch a counter (not shown), the time between zero crossings is converted into a number of clock pulses.

Figure 3:
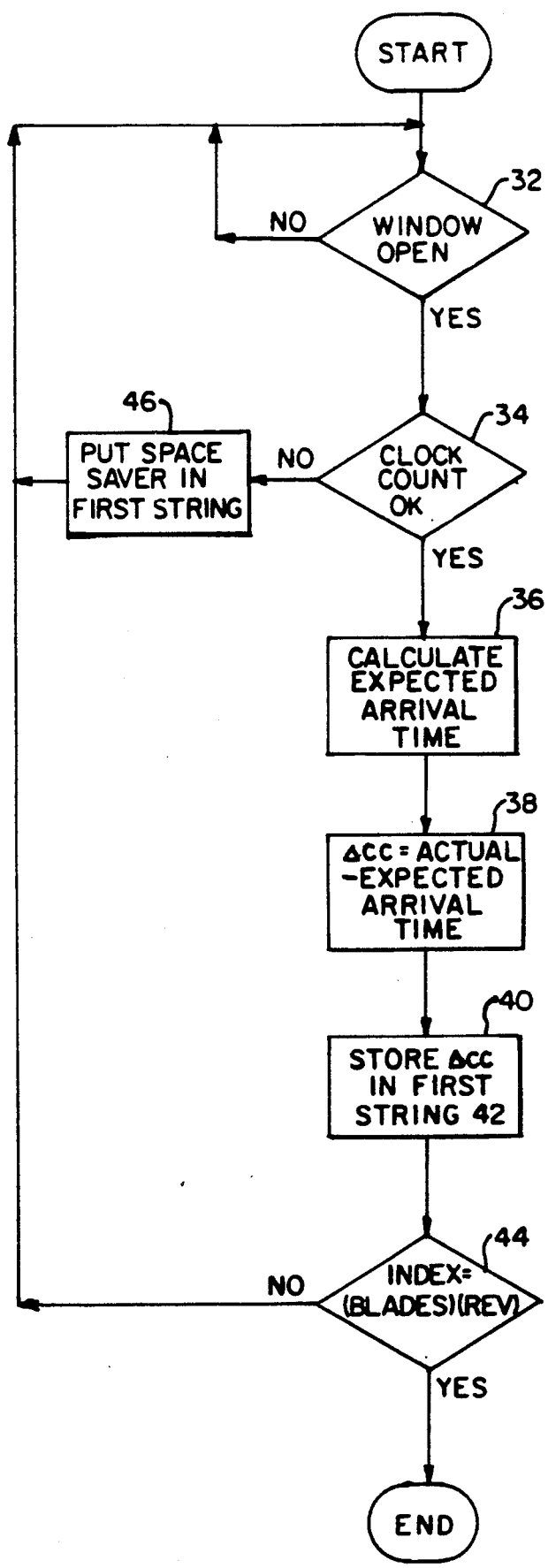
FIG. 3 is a flow chart illustrating the generation of a first string of digital information.

Referring to FIG. 3, a flow chart illustrating the generation of a first string of digital information according to the teachings of the present invention is illustrated. The steps in the flow chart of FIG. 3 may be performed by the blade vibration processor 28. At a first step 32, a determination is made if a zero crossing window is open, i.e. is it time for a zero crossing? If not, process control remains at step 32 until the window is opened. Once the window is opened, the clock count representative of the time from the last zero crossing is reviewed at step 34 to determine if it is appropriate. The purpose of step 34 is to verify that a zero crossing has been detected. If not, and the clock count is inappropriate, it can be assumed that a blade passing event has been missed. Assuming that the clock count is appropriate, process control continues at step 36 to calculate the expected arrival time of the blade at that sensor.

The expected arrival time is computed from the OPR reference signal 26 and the angular position of the blade on the rotor. The expected arrival time of the blade is expressed by a number of clock counts. After the expected arrival time has been calculated at step 36, the blade vibration processor 28 calculates, at step 38, the difference between the actual arrival time of the blade tip at the sensor minus the expected arrival time of that blade tip at that sensor. The difference between the actual arrival time and the expected arrival time represents a difference in clock counts Δcc. Deflection information can be obtained by multiplying the differences in clock counts Δcc by the velocity of the rotor 16. (Such deflection information may be input to signal analyzer 30 for analysis.)

At step 40, the value calculated in step 38 is stored in a first string of digital information 42 illustrated in FIGS. 4A–4E. Thereafter, in step 44, a determination is made if an index has reached a desired value. For example, the index may start at the first blade and continue for each of the two hundred blades for thirty-two revolutions for a total of 6,400 entries. Thus, when the index equals 6,400, the process of FIG. 3 ends; otherwise it continues by returning to step 32. In that manner, steps 32, 34, 36, 38, 40, and 44 are used to generate a plurality of data entries which are stored in string 42. If there are two hundred blades 12 in row 10, and information is generated over thirty-two revolutions, then the string 42 has a maximum of 6,400 data entries, with each data entry being representative of the actual position of the blade tip minus the expected position of that blade tip. The string of digital information 42 illustrated in FIGS. 4A–4E is responsive to one of the sensors 18. A similar string (not shown) would be produced for the other sensor.

In FIGS. 4A–4E, the string 42 is shown as having two values, an upper and a lower value. The upper value indicates the position of the datum in the string 42. For example, the number 1 indicates that that is the data entry of the first blade, first revolution. The number 201 represents the first blade, second revolution. Similarly, the number 6,400 represents the 200th blade, the thirty second revolution.

Returning to FIG. 3, in step 34, it is possible that the clock count will not be proper indicting that a zero crossing was missed or undetected. In such a case, process control proceeds to step 46 wherein a space saver character is inserted into the first string 42. The purpose of inserting such a space saver character is to maintain the data in the proper order to insure that the data corresponds to the correct blade. In FIG. 4B, it is seen that for the sixth blade, first revolution, the zero crossing was undetected such that the space saver character -9999 is inserted into the data string 42. Similarly, in FIG. 4C, for the 121st blade, first revolution, the zero crossing was undetected such that a space saver character -9999 was inserted into the string 42. Depending upon whether all the zero crossings are properly detected, it is possible to have a string 42 comprised of all data entries for points 1 through 6,400. However, the more missing or undetected zero crossings, the greater the number of space saver characters.

Figure 5:
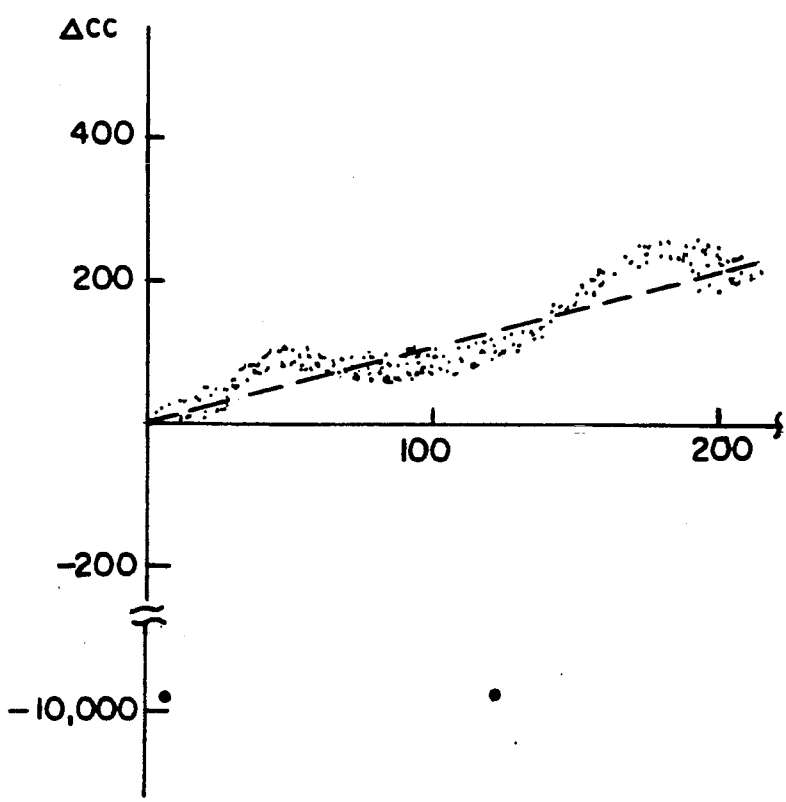
FIG. 5 is a graph illustrating a portion of the first string.

A plot of a portion of the data entries and space saver characters of string 42 is shown in FIG. 5. Shown in FIG. 5 is the deviation between the actual and expected blade tip arrival times of all 200 blades over one revolution of the shaft. Thus, FIG. 5 is a graph of Δcc versus blade number. The important aspects of the data entries plotted in FIG. 5 are (i) the slow upward-ramping of the data entries which is indicative of a slow turbine speed increase, (ii) torsional shaft vibration which causes all of the blades in the row to move together; and (iii) the scatter of the data entries which is indicative of blade vibration and of unequal blade spacing. With respect to the torsional shaft vibration of item (ii), that is shown in FIG. 5 as a slow oscillation in the data entries. Note that the torsional motion in which all blades on the row move together is typically lower in frequency than that shown. A higher-frequency torsional motion is shown for clarity. Any technique that eliminates items (i) and (ii) must not affect item (iii), and must also be able to deal with the space saver characters in the string 42.

The technique of the present invention involves the calculation of a running average over one half of the number of blades plus x. For example, if there are two hundred blades and x equals one, one half of two hundred plus one equals one hundred one. To simplify the algorithm, string 42 is lengthened by the number of blades divided by two or, in our example, by one hundred entries. Of that one hundred entries, fifty dummy entries D1–D50 are placed at the beginning of the string 42 and fifty dummy entries D51–D100 are placed at the end of the string 42. The dummy entries may take the value -9999 which is also used as the space saver character. Thus, the string 42 is comprised of 6,400 data entries plus one hundred dummy entries, recognizing that some of the 6,400 data entries may in fact wind up being replaced by space saver characters.

The present invention involves establishing a running average value for each of the data entries, starting with the first entry and terminating at entry 6,400, but not over the dummy entries D1–D100 and not including the space saver characters. The flow chart for establishing such a running average value, which may be performed by the processor 28, is set forth in FIG. 6 and begins with step 48.

In step 48, a determination is made if the entry being evaluated is a dummy entry or a space saver character. If it is either, a -9999 is placed in a second string (not shown) at step 50 and the next entry in the string 42 is evaluated at step 48. When a data entry is reached, process control proceeds to step 52 to sum the fifty data entries on either side of the entry in question and the entry itself. Dummy entries and space saver characters (-9999) are not included in the sum. Thereafter, in step 54, an average value for the data entry in question is generated by dividing the sum in step 52 by the number of entries making up that sum. At step 56, the average value is subtracted from the entry in question, and the difference is put into a second string. At step 58, a determination is made as to whether all of the entries in the first string 42 have been evaluated. If so, the program ends. Note that if a position, such as 6 in FIG. 4B, is encountered having a -9999 entry, the -9999 is transferred to the second string as shown in step 50 and no average is generated.

Figure 6:
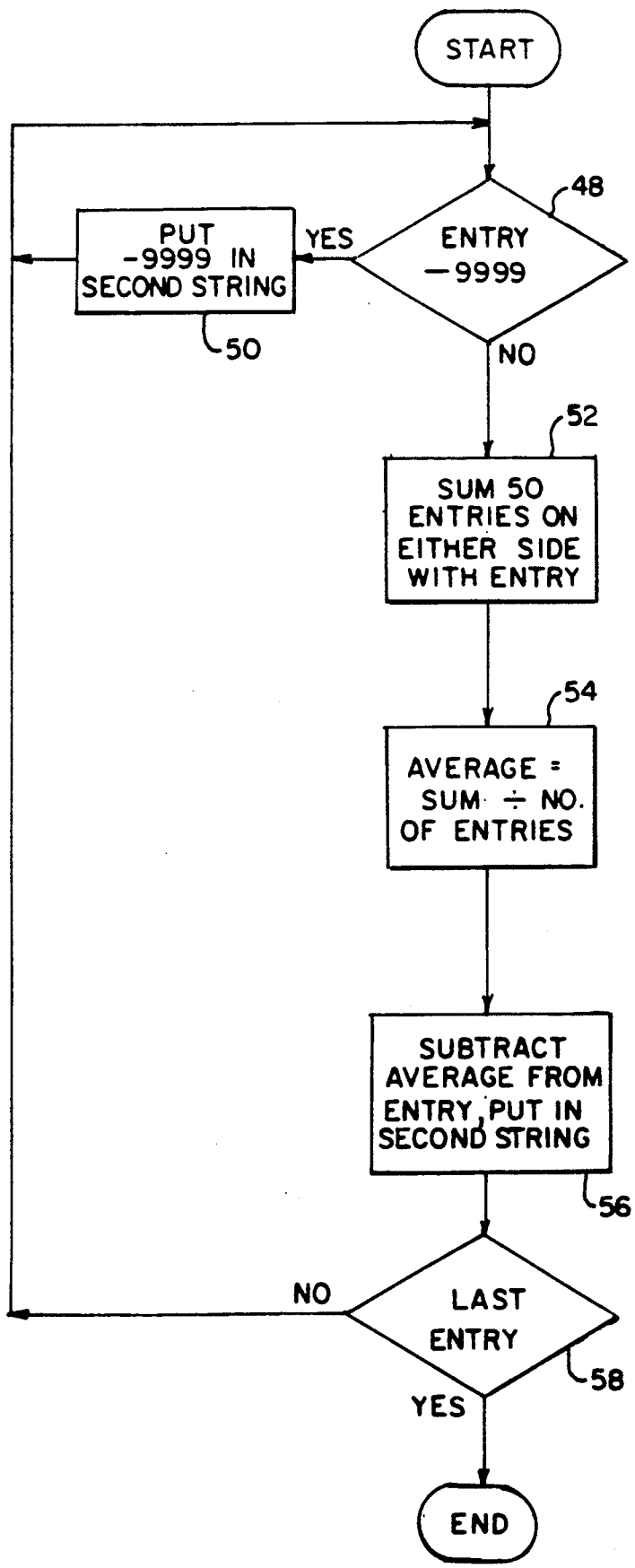
FIG. 6 is a flow chart illustrating the generation of a second string of digital information.

The procedure set forth in FIG. 6 removes data produced by torsion and speed changes without affecting the data representative of other blade vibrations because blade vibration data for a particular blade occurs, in this example, every two hundred entries. Data from many random blade vibrations exists in the average of the one hundred one entries; thus, that random blade vibration information is completely cancelled in the average value. Only torsional and speed change information remains in the average values calculated for each data entry. Therefore, when the average value is subtracted from the corresponding data entry, only blade vibration information of interest remains.

Figure 7:
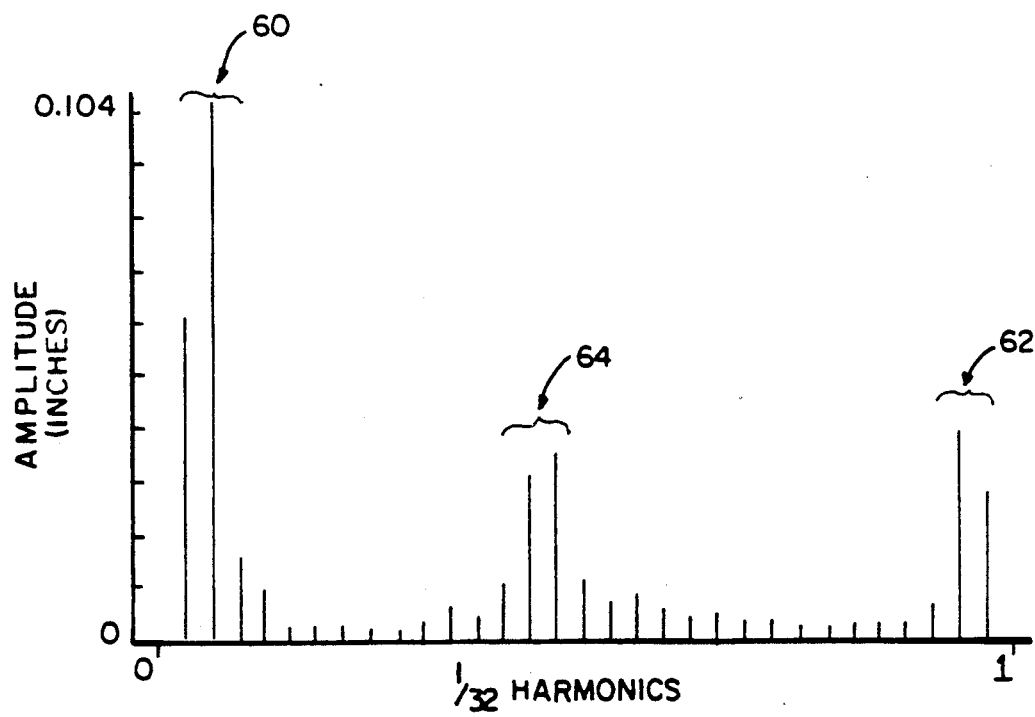
FIGS. 7 and 8 are graphs of blade vibration information (amplitude versus harmonics) for a single blade without the application of the present invention and with the application of the present invention, respectively.
Figure 8:
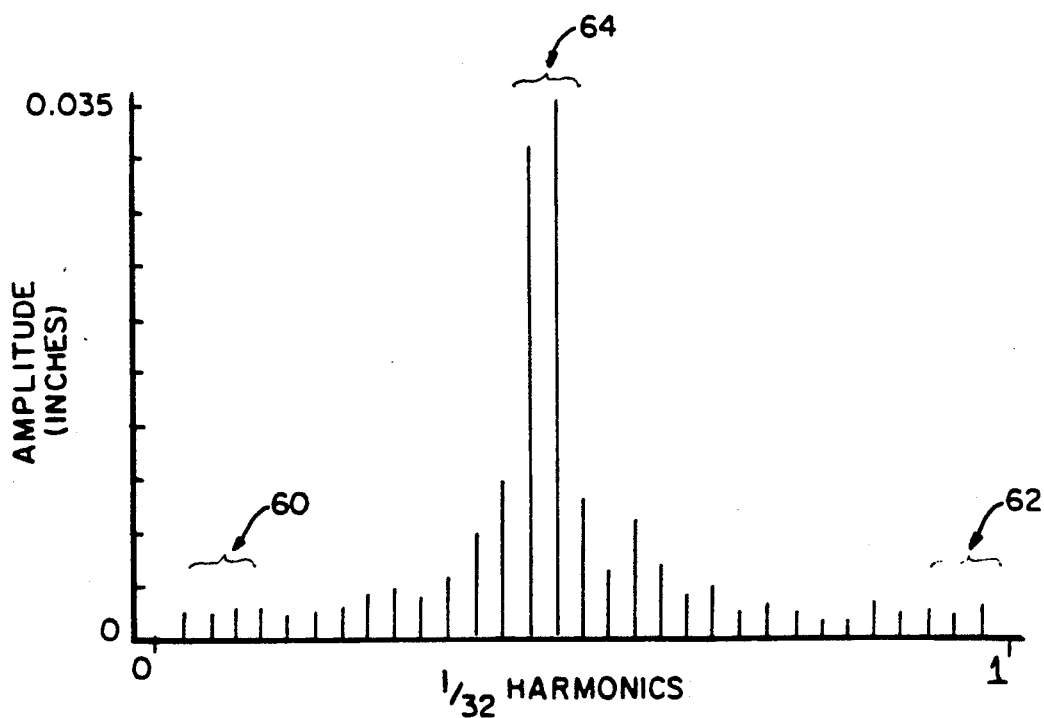

FIGS. 7 and 8 are graphs of blade vibration information (amplitude in inches versus harmonics) for a single blade without the application of the present invention and with the application of the present invention, respectively. In FIG. 7, note the blade vibration signals due to torsion, speed changes, etc. as shown at 60 and 62. In addition to their presence, their magnitude prevents the vibration signals of interest 64 from being graphed in a definitive manner. In contrast, in FIG. 8, by virtue of the present invention's removal of the vibration signals 60 and 62, the vibration signals of interest 64 can be graphed in a more meaningful manner as through a change in the Y axis. As seen, the present invention does not affect the vibration signals 64 of interest but rather removes the vibrational data due to events known not to cause stresses in the turbine blades.

Figure 9:
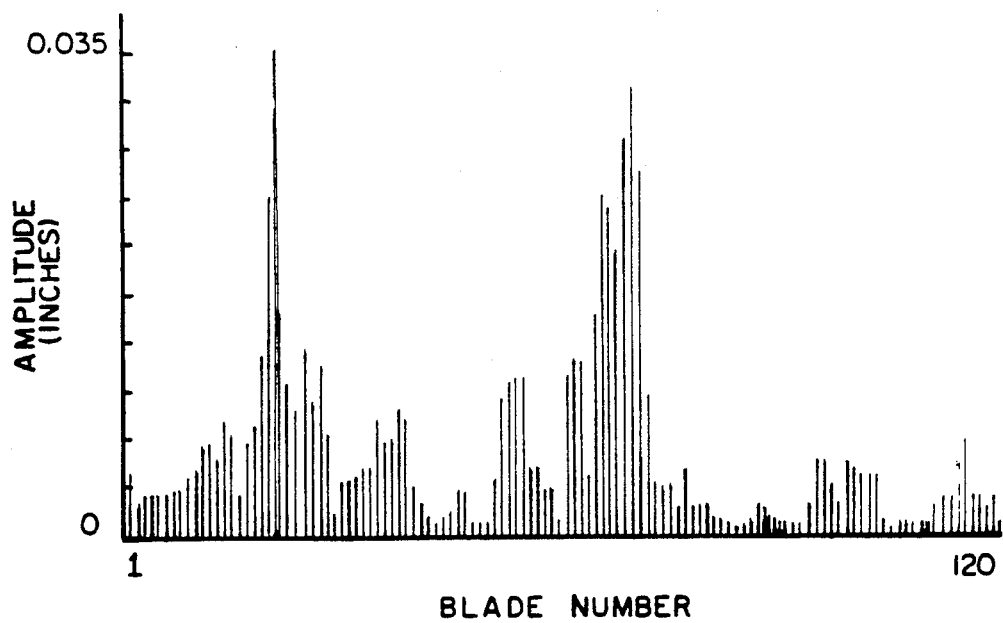
FIGS. 9 and 10 are graphs of blade vibration information (amplitude versus blade number) for all the blades without the application of the present invention and with the application of the present invention, respectively.
Figure 10:
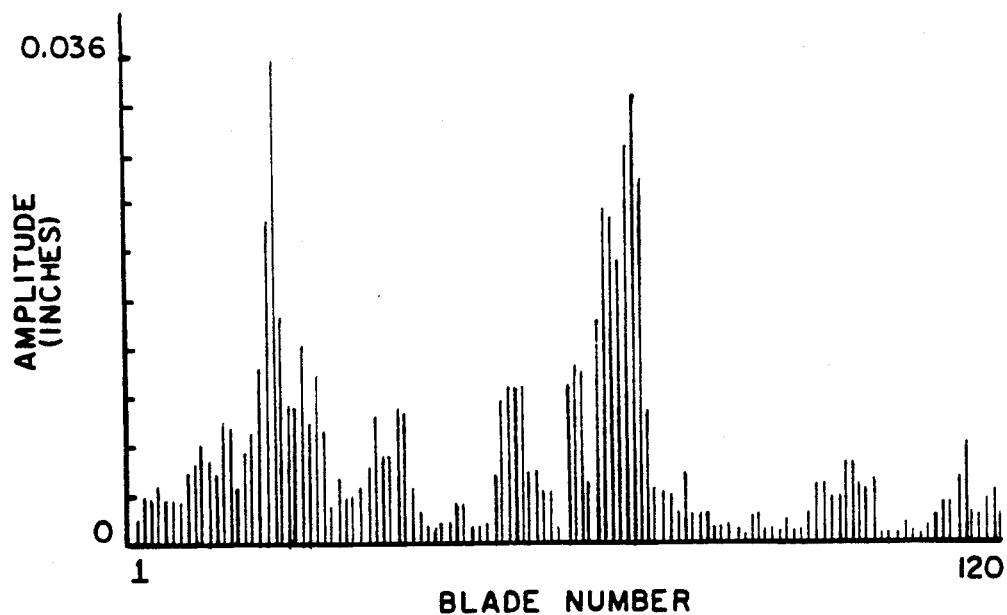

FIGS. 9 and 10 are graphs of blade vibration information (amplitude in inches versus blade number) for all the blades without the application of the present invention and with the application of the present invention, respectively. As can be seen by a comparison of FIGS. 9 and 10, the present invention does not affect the measured blade vibration amplitude for each blade in the row. Thus, it is clear that the present invention is capable of removing data representative of common mode vibration while leaving the remainder of the vibrational data unaffected.

The present invention is also directed to a method of removing common mode vibration data from digital turbine blade vibration data. The method is comprised of the steps of producing a signal indicative of the actual arrival time of each turbine blade at a sensor. Digital data representing the actual arrival time of each turbine blade at the sensor is produced from the signal. Expected arrial times at the sensor are established for each blade. A plurality of data entries, each representing the differences between the actual arrival time and the expected arrival time, is generated. The data entries are stored in a first string having a plurality of dummy entries at the beginning thereof and at the end thereof. Space saver characters are inserted into the first string in the event that a data entry for a particular blade is not produced. An average value is established, over a plurality of data entries, corresponding to each data entry. That average value is representative of the vibration common to all of the turbine blades. Each average value is subtracted from its corresponding data entry in the first string to produce a second string wherein the entries in the second string are free of common mode vibration data.

The apparatus and method of the present invention remove displacement data due to certain static displacements, torsional vibration, and rotor speed changes from the monitored blade deflection data before processing. The displacements that are removed are characterized by their approximately equal effect in amplitude and phase on all blades. Such displacements are usually at low frequencies and therefor are not associated with significant blade stress. Higher frequency vibration displacements, which may be associated with significant blade stress, are also removed, but those torsional responses may be detected independently by a companion torsional blade vibration monitor system. The improved efficiency in finding data entries reduces the data processing time which means shorter intervals between observations of a particular blade. By enabling the observation intervals to be shortened, the time between onset of vibration and notification of the operator is reduced thereby increasing the likelihood of detecting a transient high deflection event.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. An apparatus for removing common mode vibration data from digital turbine blade vibration data, comprising:
   sensor means for producing a signal indicative of the actual arrival time of each turbine blade at said sensor means;
   first means responsive to said sensor means for producing digital data representing the actual arrival time of each turbine blade at said sensor means;
   second means for establishing an expected arrival time for each turbine blade at said sensor means;
   third means responsive to said digital data for generating a plurality of data entries each representing the difference between said actual arrival time and said expected arrival time;
   fourth means for storing said data entries in a first string having a plurality of dummy entries at the beginning thereof and at the end thereof and for inserting into said first string space saver characters in the event that a data entry for a blade is not produced;
   fifth means for establishing an average value, over a plurality of data entries, for each data entry, said average value being representative of the vibration common to all of the turbine blades; and
   sixth means for subtracting each of said average values from its corresponding data entry to produce a second string wherein the entries in said second string are free of common mode vibration data.

2. The apparatus of claim 1 wherein said fifth means includes means for adding each data entry to a plurality of data entries preceding said data entry and a plurality of entries following said data entry in said first string to establish a sum, and means for dividing said sum by the number of data entries making up said sum to establish said average value.

3. The apparatus of claim 2 wherein said average value is established over a plurality of data entries numbering one-half the number of blades plus one.

4. The apparatus of claim 3 wherein the number of blades is two hundred and the plurality of data entries numbers one hundred one.

5. The apparatus of claim 4 wherein the plurality of dummy entries at the beginning of said first string is fifty in number and wherein the plurality of dummy entries at the end of said first string is fifty in number.

6. The apparatus of claim 5 wherein said fifth means includes means for adding each data entry to the fifty entries preceding said data entry, excluding dummy entries, and the fifty entries following said data entry, excluding dummy entries, in said first string to establish said sum.

7. The apparatus of claim 1 wherein said first string includes a plurality of data entries corresponding to the number of blades times the number of revolutions over which arrival time data is to be generated.

8. A method for removing common mode vibration data from digital turbine blade vibration data, comprising the steps of:
   producing a signal indicative of the actual arrival time of each turbine blade at a sensor means;
   producing digital data representing the actual arrival time of each turbine blade at said sensor means from said signal;

establishing an expected arrival time for each turbine blade at said sensor means;

generating a plurality of data entries each representing the difference between said actual arrival time and said expected arrival time;

storing said data entries in a first string having a plurality of dummy entries at the beginning thereof and at the end thereof and inserting into said first string space saver characters in the event that a data entry for a blade is not produced;

establishing an average value, over a plurality of entries, for each data entry, said average value being representative of the vibration common to all of the turbine blades; and subtracting each of said average values from its corresponding data entry in said first string to produce a second string wherein the entries in said second string are free of common mode vibration data.

* * * * *